May 26, 1964

R. F. WHITE ETAL 3,134,405

VALVE

Filed March 9, 1961

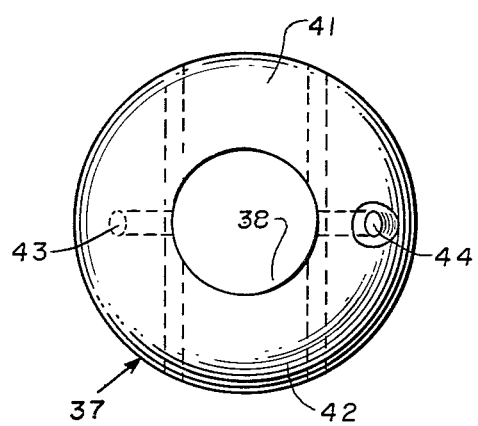
FIG. 2
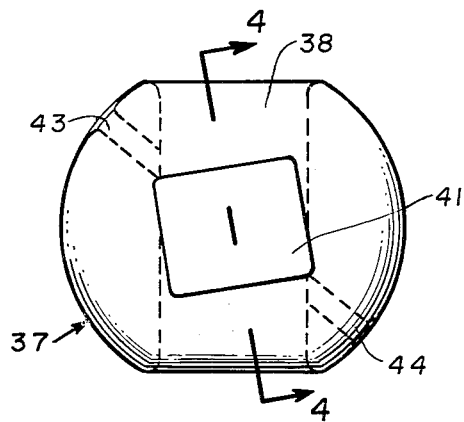
FIG. 3
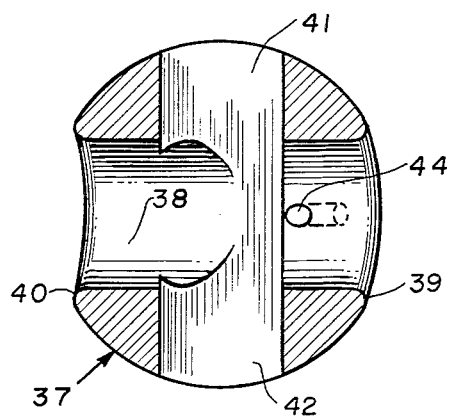
FIG. 4
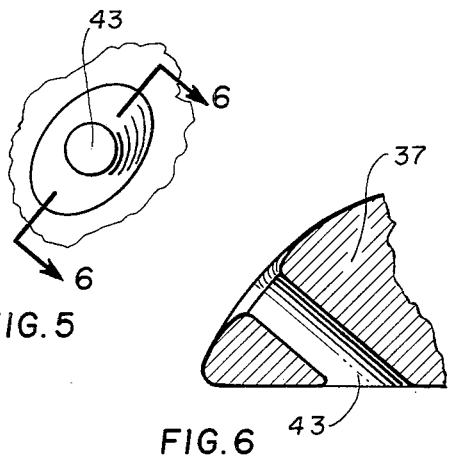
FIG. 5
FIG. 6
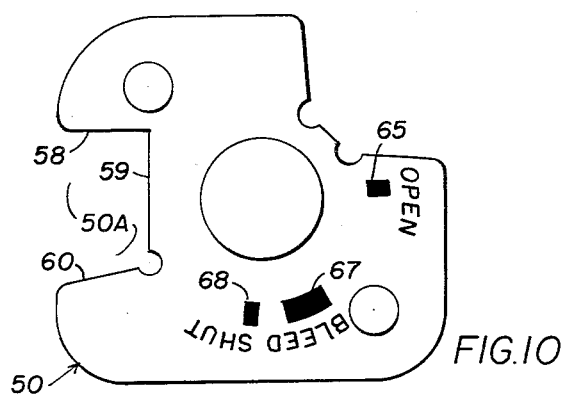
FIG. 10

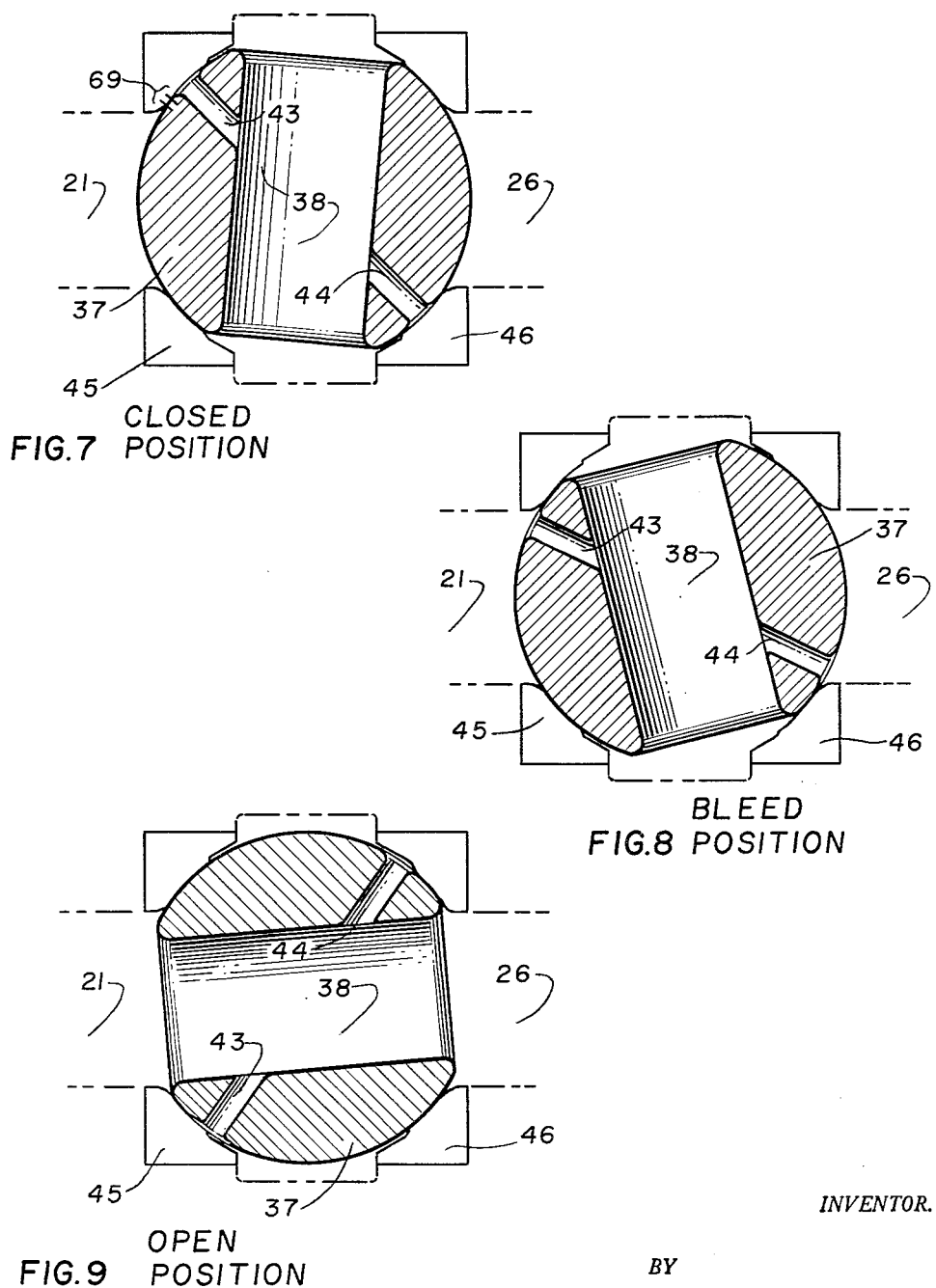

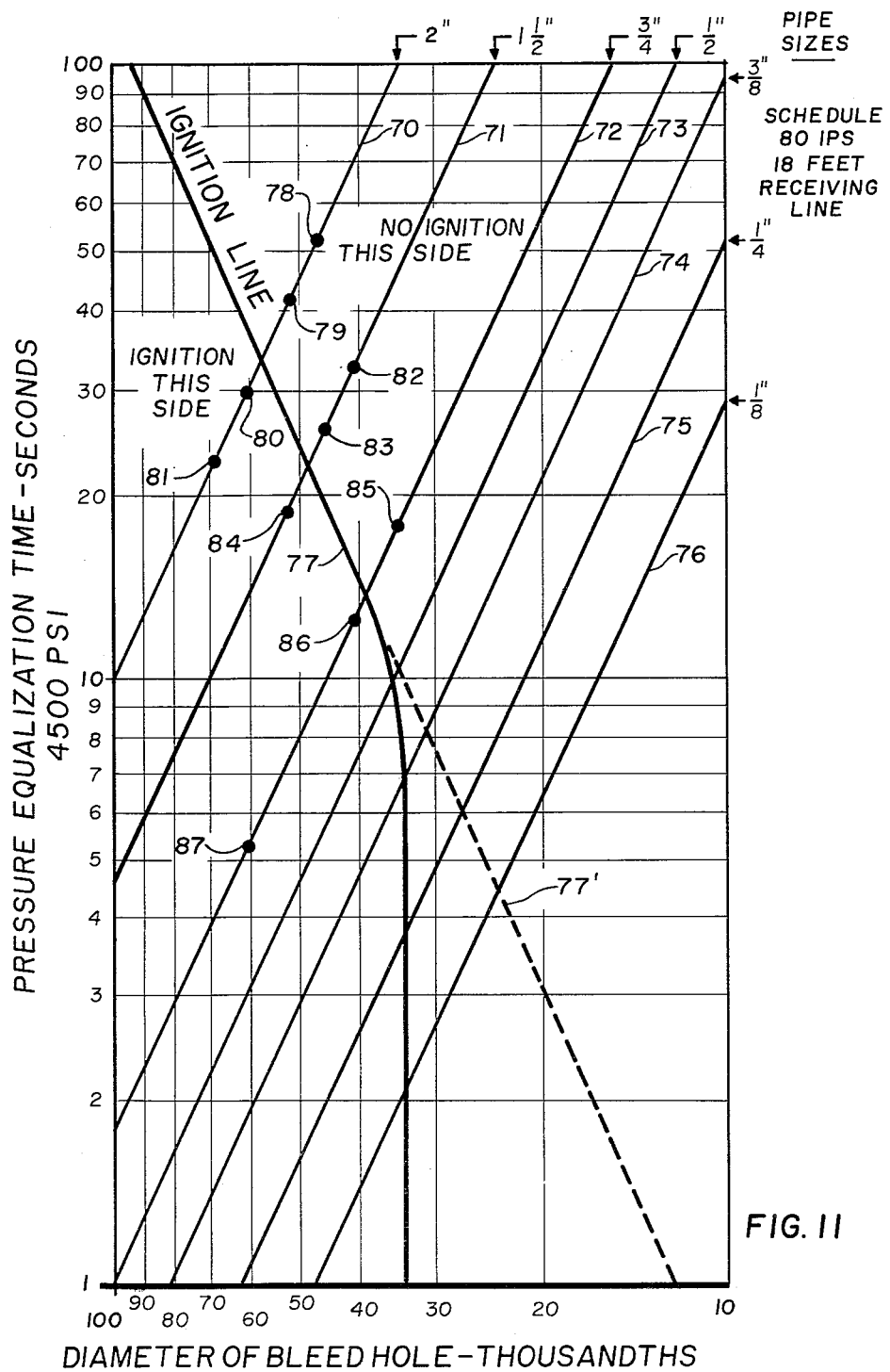
FIG. II

United States Patent Office 3,134,405
Patented May 26, 1964

3,134,405
VALVE
Robert F. White, Stonington, and David V. Pearson, Mystic, Conn., assignors to General Dynamics Corporation, New York, N.Y., a corporation of Delaware
Filed Mar. 9, 1961, Ser. No. 94,632
2 Claims. (Cl. 137—625.32)

The present invention relates to valves and more particularly to valves for use in high pressure gas lines such as in high pressure air systems in submarines.

The sudden admission of a gas from a high pressure source to a space at lower pressure normally results in a rise in temperature in the lower pressure space or "receiver." For any given pressure differential, this rise in temperature depends primarily on three factors, the type of gas, the rate of pressure rise in the receiver, and the ability of the receiver to dissipate heat. The temperature rise in the receiver is of particular importance in systems handling a gas having even a small quantity of flammable material entrained therein, as, for example, a high pressure air system where small quantities of oil from the mechanical compressing equipment are entrained in the air. After such a system has been in use for any substantial time, the oil or other flammable material is found in the piping system for the gas either in small isolated pockets or as a film lining the pipe walls. If the gas temperature in a part of the piping system should rise to the ignition level of the oil or other flammable material, an explosion may result with consequent damage to the system and hazard to personnel. The temperature rise in the receiving portion of the system resulting from admission of high pressure gas can and has caused such explosions. This danger of explosion is particularly acute in high pressure air systems for submarines wherein high pressure air is often allowed to enter relatively small volume portions of the piping system.

The principal object of the present invention has been to provide a novel and improved valve construction for use in high pressure gas systems and which avoids the danger of explosion because of temperature rise in the receiver due to opening of the valve.

Another object of the invention has been to provide a valve construction for use in high pressure gas systems in which the danger of explosion due to valve opening is eliminated without sacrificing the quick shut off feature of a ball valve.

Another object of the invention has been to provide a novel and improved ball valve for use in high pressure gas systems and which avoids the danger of explosion upon opening of the valve.

A feature of the invention has been the provision of a novel and improved ball valve of the above type in which the ball is constructed so as to provide a controlled rate of change of pressure differential between the upstream and downstream sides of the valve.

Still another feature of the invention has been the provision of a ball valve of the above type which is constructed so as to prevent accidental operation of the valve to a position in which an explosion might result.

Other and further objects, features and advantages of the invention will appear more fully from the following description of the invention taken in connection with the appended drawings, in which:

FIG. 2 is an end elevational view of a ball constructed in accordance with the invention;

FIG. 3 is a top plan view of the ball of FIG. 2;

FIG. 4 is a longitudinal sectional view taken along the line 4—4 of FIG. 3;

FIG. 5 is a fragmentary plan view of a portion of the surface of a ball illustrating a preferred form of construction;

FIG. 6 is a sectional view taken along the line 6—6 of FIG. 5;

FIG. 7 is a schematic diagram illustrating the operation of the valve of the invention in closed position;

FIG. 8 is a schematic diagram similar to FIG. 7 but showing the valve in bleed position;

FIG. 9 is a schematic diagram similar to FIG. 7 but showing the valve in open position;

FIG. 10 is a plan view of the bleed position stop plate shown in FIG. 1; and

FIG. 11 is a series of curves illustrating the relationship between certain design parameters.

Figures 1, 1A:
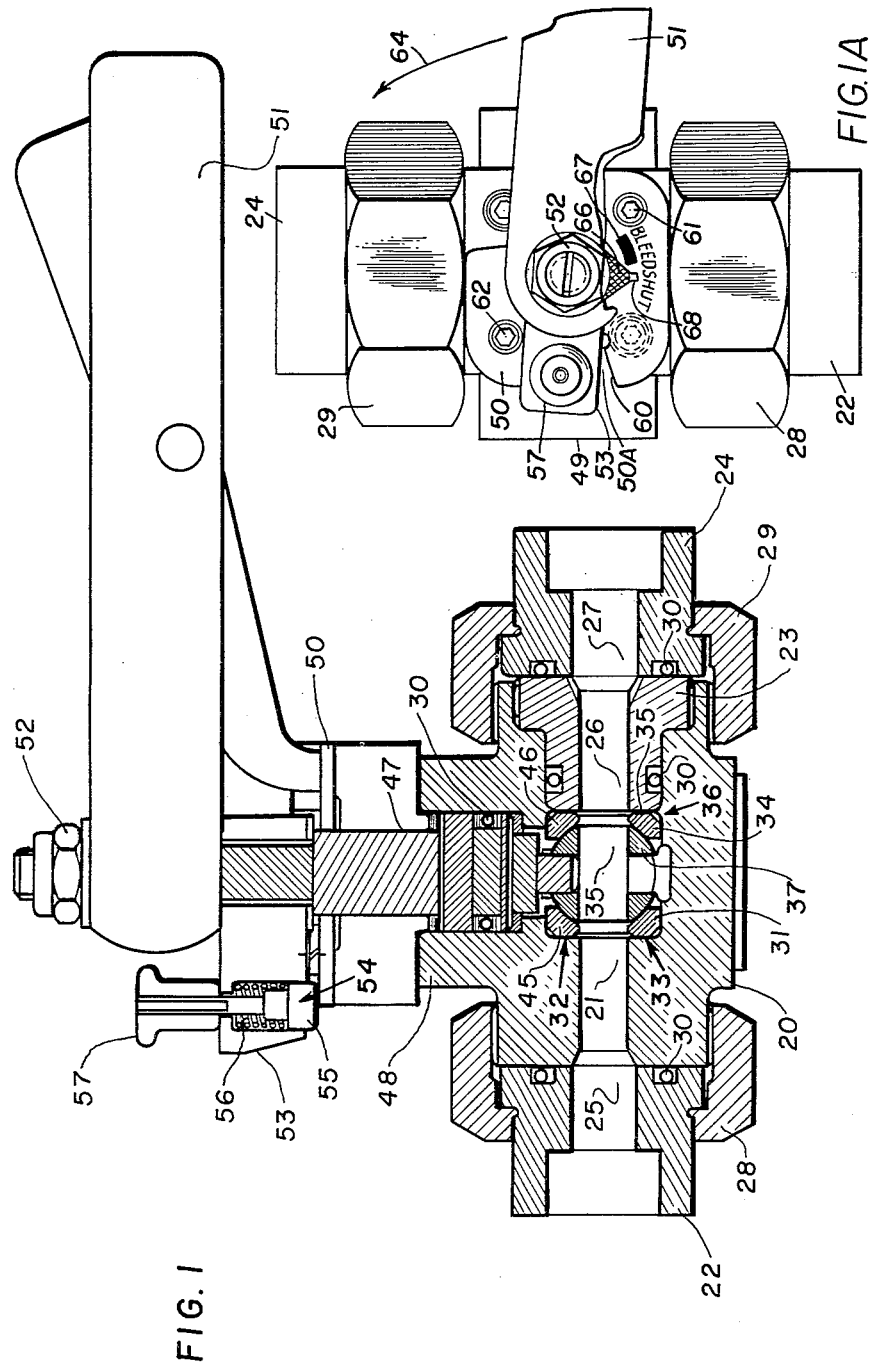
FIG. 1 is a longitudinal cross-sectional view of a valve construction embodying the invention, the valve being shown in open position.
FIG. 1A is a top plan view of the valve of FIG. 1 in shut position.

Referring now to the drawings, and more particularly to FIG. 1, there is shown a valve construction embodying the principles of the invention. The valve comprises a body 20 having an axially extending fluid passage 21, a tailpiece 22 abutting one end of the body 20, a retaining nut 23 abutting the other end of the body 20, and a tailpiece 24 abutting the other end of the nut 23. The tailpieces 22, the retaining nut 23 and the tailpiece 24 have axially extending fluid passages 25, 26 and 27, respectively, communicating with the fluid passage 21 and axially aligned therewith. The tailpiece 22 is held in assembled relation with valve body 20 by means of a nut 28 which is in threaded engagement with an external cylindrical surface of valve body 20. A nut 29, which is similarly in threaded engagement with an external cylindrical surface of valve body 20, holds tailpiece 24 in assembled relation with valve body 20 and nut 23. The nut 23 is in threaded engagement with an internal cylindrical surface of valve body 20. Suitable sealing means such as O rings 30 are provided for affording pressure-tight seals to prevent leakage.

The valve body 20 is formed with an axially extending annular surface 31 and a radially extending annular surface 32 forming a valve seat 33. Valve body 20 also has an axially extending annular surface 34, which, together with radially extending surface 35 at the inner end of nut 23, forms a valve seat 36. The valve seats 33 and 36 are axially aligned and axially spaced to define a chamber adapted to contain a ball 37 forming the valve closure element. Ball 37 is shown in detail in FIGS. 2–4 and is spherical in shape and has a central cylindrical passage 38 adapted to be aligned with passages 21 and 26 to provide communication between the upstream and downstream sides of the valve. Opposite ends of the ball are removed to provide rounded annular seal-engaging noses 39 and 40.

Rectangular slots 41 and 42 extending along an axis perpendicular to the axis of passage 38 are provided to receive a valve stem. Only one slot is needed, but to make the ball symmetrical it is convenient to provide one on each side of the passage 38.

A circular hole 43 is drilled in the wall of the ball 37 to provide communication between the outside of the ball and passage 38 for a reason to be discussed below. A circular hole 44 is drilled in the wall of the ball 37 diagonally opposite the hole 43, the holes 43 and 44 being on a common axis which lies in a plane which contains the axis of passage 38. The axis of holes 43 and 44 might be disposed at an angle such as 50° with respect to the axis of passage 38.

As shown in FIG. 1, ball 37 is held between two annular seat seals 45 and 46 which may be made of any suitable material, a preferred material being a molybdenum disulfide impregnated nylon. The seals 45 and 46 are preferably constructed and shaped in accordance with the teachings of the United States patent application of Bass and White, Serial No. 826,048 filed July 9, 1959, now Patent Number 2,989,990.

A generally cylindrical valve stem 47 is mounted for rotation in a laterally extending opening in a bonnet portion 48 of valve housing 20. The lower end of valve stem 47 is shaped to correspond to slot 41 of ball 37 so that rotation of valve stem 47 produces corresponding rotation of ball 37. Valve stem 47 also rotates in a bonnet cap 49 mounted on top of bonnet 48 and in a bleed position stop plate 50 mounted on top of bonnet cap 49. A valve operating handle 51 is mounted at the upper end of stem 47 and is held in place thereon by a nut 52. Valve stem 47 also carries a stop arm 53 mounted below the handle 51.

Stop arm 53 has a vertical bore in one end which accommodates a pin 54. The lower end 55 of pin 54 just fits the bore in arm 53, while above lower end 55 is a shoulder which accommodates the end of a coil spring 56. The spring 56 urges pin 54 downwardly. The downward travel of pin 54 is stopped by contact of a knob 57 carried on the upper end of pin 54 with the upper surface of arm 53. Knob 57 is adapted to be raised manually so as to bring lower end 55 of pin 54 completely within the bore in arm 53. In the FIG. 1 position of handle 51, the bottom of stop pin 54 rests on the surface of plate 50.

The surface configuration of stop plate 50 is best shown in FIGS. 1A and 10, FIG. 1A being a plan view corresponding to FIG. 1 but with the valve in shut position rather than open position. Stop plate 50 has an opening 50A in one side thereof formed by shoulders 58, 59 and 60. The lower end 55 of pin 54 is adapted to enter the opening 50A when the handle 51 is appropriately positioned.

When the end 55 of pin 53 contacts shoulder 58, as in FIG. 1A, the valve is shut. When the end 55 contacts shoulder 60, the valve is in a bleed position in which holes 43 and 44 are positioned to effect pressure equalization between the upstream and downstream sides of the valve. When the handle 51 has been rotated 90° from its shut position, the valve is completely open and ball passage 38 is aligned with passages 25, 21, 26 and 27, as shown in FIG. 1. In this position, the bottom end of pin 54 will be riding on the surface of plate 50 as in FIG. 1.

With the valve shut, rotation of the handle 51 in a counterclockwise direction, as shown by the arrow 64 in FIG. 1A, will bring end 55 of pin 54 into contact with shoulder 60, and this contact will prevent further rotation of handle 51 until knob 57 is manually raised to lift end 55 of pin 54 out of engagement with shoulder 60. Upon such manual raising of pin 55 the handle 51 may be rotated to the completely open position of the valve. Rotation of handle 51 beyond the fully open and fully shut positions is prevented by engagement of arm 53 with studs 61 and 62, respectively. The open position of the valve is shown by an engraved stop marking 65 on the surface of plate 50, the marking being associated with a pointer 66 (FIG. 1A) carried by handle 51. Similar engraved markings 67 and 68 corresponding to the bleed and shut positions of the pointer 66 are also provided on the plate 50.

The operation of the valve can best be understood with reference to FIGS. 7, 8 and 9, which are schematic views corresponding to sections taken transversely along the valve axis in FIG. 1 and in closed, bleed and open valve positions, respectively. In FIG. 7 the passage 38 is completely out of communication with the passages 21 and 26. Either one of passages 21 and 26 may be considered the upstream side of the valve. Taking passage 26 as the upstream side, the sealing contact between the ball 37 and an annular area generally designated 69 of downstream seat seal 45 prevents the flow of high pressure gas from passage 26 to passage 21. It will be observed that passage 43 is located inwardly of the area 69 in FIG. 7. When the ball 37 is rotated to the bleed position of FIG. 8, the passage 38 is still not in direct communication with the passages 21 and 26, but gas pressure on the upstream side causes gas to flow from passage 26 to passage 21 through the path formed by bleed hole or passage 44, passage 38 and bleed hole or passage 43. When pressure equalization has been achieved or substantially achieved so that danger of explosion is removed, the ball 37 may be rotated to its FIG. 9 position, in which free communication between the passages 21 and 26 is afforded directly through ball passage 38. In submarine high pressure air system ball valves heretofore used it has been the practice to open the valves very slowly to minimize danger of explosion. One result of such slow opening has been a tendency for air flow to erode the downstream seat seal. By locating the downstream bleed hole 43 so that during bleeding air will not directly impinge on seat seal 45 such erosion is prevented. Moreover, by providing a stop effective to stop ball rotation in the bleed position, the bleed position may be achieved without delay thereby preventing erosion while moving the ball to its bleed position.

It is desirable that the junction of the holes or passages 43 and 44 of the ball surface be faired to prevent damage to the seat seals 45 and 46. This fairing may be effected as shown in FIGS. 5 and 6 by providing a dished or concave recess whose depth is about one-quarter the diameter of the hole 43 and which is generally elliptical in shape with a major axis about three times the diameter of the hole 43 and a minor axis about two times the diameter of the hole 43.

The holes or passages 43 and 44 are preferably of the same diameter, and it is desirable that this diameter be as large as possible consistent with the necessity for pressure equalization without danger of explosion. The smaller the diameter of these holes the greater will be the time required for pressure equalization, but also the smaller the diameter the lesser will be the temperature rise on the receiving side. The temperature rise on the receiving side will be dependent on the pressure differential across the valve and the heat flow characteristics and volume of the receiving side passages, and these factors will largely dictate the diameter required of the holes 43 and 44.

In dealing with high pressure (4500 p.s.i.) air systems in submarines, a receiving volume equal to 18 feet of pipe may be taken as a typical installation situation. The empirical relationship between bleed hole diameter and required bleed time for various receiving pipe diameters is shown in FIG. 11, which is a logarithmic plot of hole diameter versus time required for pressure equalization. In each case the initial pressure differential is 4500 p.s.i. The pipe sizes are in nominal internal diameters for Schedule 80 IPS.

In FIG. 11, lines 70, 71, 72, 73, 74, 75 and 76 each represent the locus of points determined by bleeding a 4500 p.s.i. compressed air source into an 18′ length of pipe through bleed holes of different diameters and plotting the diameters of the holes versus time required for pressure equalization. Initially, the receiving pipes were at atmospheric pressure. The air was charged with a small standardized quantity of entrained lubricating oil picked up from a wick in the compressor air intake and intended to simulate typical conditions which could be expected in submarine compressed air systems.

For any given receiving pipe diameter, as the bleed hole diameter was increased a point was reached at which the temperature within the receiving pipe reached the ignition point for the oil. The curve 77 represents the locus of the bleed hole diameters separating an ignition condition from a non-ignition condition. Thus, under the conditions specified, the intersection of any of the lines 70–76 and the curve 77 represents the minimum safe bleed hole diameter for the corresponding size receiving pipe. It will be observed that the curve 77 starts to bend for receiving pipe diameters less than about ¾" and reaches a constant value of about .034" for receiving pipe diameters less than about ⅜". It is believed that one reason for the change in curve 77 is that as the pipe diameter gets smaller, cooling of the air in the receiving pipe through the walls of the receiving pipe becomes less significant. If this cooling effect could be ignored, curve 77 would continue as shown at 77'.

A few typical experimental points are shown in FIG. 11. Thus, for a two inch diameter receiving pipe, points 78, 79, 80 and 81 correspond to bleed hole diameters of .046, .051, .059 and .066 inch, respectively. The bleed times corresponding to points 78 and 79 (52.5 and 41.5 seconds, respectively) were sufficiently great that no ignition occurred. But the bleed times for points 80 and 81 (30 and 22 seconds, respectively) were so short that the temperature build-up in the receiving pipe resulted in ignition of the oil-air mixture, the action being comparable to that in a diesel engine. Points 82 and 83 represent no ignition for a 1½" diameter pipe, while point 84 represents ignition in this pipe. The point 85 represents no ignition in a ¾" pipe, while the points 86 and 87 represent ignition in this pipe.

It should be remembered that FIG. 11 represents only one set of conditions, and that different results would be achieved by changing variables such as receiving pipe length or wall thickness.

While the invention has been described in connection with a specific embodiment thereof and in a specific use, various modifications thereof will occur to those skilled in the art without departing from the spirit and scope of the invention as set forth in the appended claims.

What is claimed is:

1. A ball valve for use in high pressure gas systems, comprising a valve housing having axially aligned inlet and outlet ports, a rotatable ball disposed in the space within said housing and having a central bore with a diameter substantially equal to the diameter of said ports and being arranged in a first rotational position of said ball to be aligned with said ports to provide communication between said ports, a first annular valve seat adjacent and concentric with said outlet port, a second annular valve seat adjacent and concentric with said inlet port, and first and second annular seal rings disposed in said first and second seats and arranged to contact the surface of said ball to support the latter in said housing, said ball, in a second rotational position thereof, being arranged with said bore out of communication with said ports, said ball having a pair of axially aligned holes extending through diametrically opposite walls of said ball between said bore and the outside of said ball, the outside surface of said ball having a concave recess at the juncture of each of said holes with the outside surface of said ball, said concave recesses having a depth equal to about one-quarter the diameter of said holes, the axis of said holes lying in a common plane with the axis of said bore but being inclined relative thereto by a substantial angle so that in a third rotational position of said ball intermediate said first and second positions each of said holes communicates directly with a respective one of said ports, the diameter of said holes being substantially smaller than the diameter of said bore so that pressure equalization between said ports occurs at a controlled relatively slow rate when said ball is in said third rotational position, said holes being spaced from said seal rings when said ball is in said third rotational position thereof to prevent eroson of the downstream seal ring during pressure equalization.

2. A ball valve for use in high pressure gas systems, comprising a valve housing having inlet and outlet ports, a rotatable ball disposed in the space within said housing and having a central bore with a diameter substantially equal to the diameter of said ports and being arranged in a first rotational position of said ball to be aligned with said ports to provide communication between said ports, a first annular valve seat adjacent and concentric with said outlet port, a second annular valve seat adjacent and concentric with said inlet port, first and second annular seal rings disposed in said first and second seats and arranged to contact the surface of said ball to support the latter in said housing, said ball, in a second rotational position thereof, being arranged with said bore out of communication with said ports, said ball having a pair of axially aligned holes extending through diametrically opposite walls of said ball between said bore and the outside of said ball, the outside surface of said ball having a concave recess at the juncture of each of said holes with the outside surface of said ball, said concave recesses having a depth equal to about one-quarter the diameter of said holes and being generally elliptical in shape with a major axis about three times the diameter of said holes and a minor axis about two times the diameter of said holes, said holes being positioned to provide pressure equalization between said inlet port and said outlet port in a third rotational position of said ball intermediate said first and second positions, the diameter of said holes being substantially smaller than the diameter of said bore so that said pressure equalization occurs at a controlled relatively slow rate, said holes being spaced from said seal rings when said ball is in said third rotational position thereof to prevent erosion of the downstream seal ring during pressure equalization, said ball having an additional recess, a valve stem extending through said housing and entering said additional recess for rotating said ball, a handle arranged to rotate said valve stem thereby to rotate said ball between said first, second and third positions thereof, and means to limit movement of said handle whereby accidental movement of said ball from said second position to said first position is prevented, said last mentioned means comprising a plate mounted on said housing and having an aperture with sides positioned relative to said handle to correspond to positions of said handle in turn corresponding to said second and third positions of said ball and a retractable pin mounted on said handle and arranged to enter said aperture when said handle is moved to place said ball in said second position thereof.

References Cited in the file of this patent

UNITED STATES PATENTS

| | | |
|---|---|---|
| 596,871 | Grist | Jan. 4, 1898 |
| 715,716 | Webster | Dec. 9, 1902 |
| 2,621,012 | Graham | Dec. 9, 1952 |
| 2,895,710 | Sanctuary | July 24, 1959 |
| 2,965,313 | Jay | Dec. 20, 1960 |

FOREIGN PATENTS

| | | |
|---|---|---|
| 1,208,862 | France | Sept. 14, 1959 |